United States Patent [19]

Friedel

[11] Patent Number: 4,573,310
[45] Date of Patent: Mar. 4, 1986

[54] HORTICULTURAL AID

[76] Inventor: Bernard G. Friedel, P.O. Box 487, Hardin, Ill. 62047

[21] Appl. No.: 670,209

[22] Filed: Nov. 13, 1984

[51] Int. Cl.$^4$ .......................................... A01D 46/24
[52] U.S. Cl. ...................................... 56/329; 47/1 R
[58] Field of Search ......... 56/328 R, 329, 1, DIG. 18, 56/327 R; 47/1 R, 25, 32, 33

[56] References Cited

U.S. PATENT DOCUMENTS

| | | | |
|---|---|---|---|
| 1,371,999 | 3/1921 | Allshouse | 56/329 |
| 2,436,173 | 2/1948 | Knapp | 56/329 |
| 2,700,269 | 1/1955 | Lowe | 56/329 |
| 3,701,243 | 10/1972 | Durkee | 56/DIG. 18 |
| 4,414,795 | 11/1983 | Johnstone et al. | 56/329 |

Primary Examiner—Gene Mancene
Assistant Examiner—John G. Weiss
Attorney, Agent, or Firm—Polster, Polster and Lucchesi

[57] ABSTRACT

A horticultural aid, particularly for topiary work, has a pair of frame members, each having an open side, with the open sides facing one another, mounted on a support bar for limited movement toward and away from one another. The frames have elastic netting mounted in the frames and arranged to embrace the small trunk or limb of the plant to be trimmed to catch the trimmings. The device is provided with a handle, and the frame members are biased toward one another.

5 Claims, 3 Drawing Figures

HORTICULTURAL AID

BACKGROUND OF THE INVENTION

In topiary work, especially in rock gardens and the like, cuttings from the plant being trimmed or shaped fall into crevasses in the rocks and are hard to remove.

One of the objects of this invention is to provide a horticultural aid to permit trimmings from plants to be caught and removed easily.

Another object is to provide such a device that is light, simple, and easy to use.

Other objects will become apparent to those skilled in the art in the light of the following description and accompanying drawing.

SUMMARY OF THE INVENTION

In accordance with this invention, generally stated, a horticultural aid is provided which includes a handle, a support bar connected to the handle, a pair of frame members having open sides facing one another mounted on the support bar for limited movement toward and away from one another, and elastic netting mounted in the frame members and arranged to embrace a small trunk or limb of a plant to be trimmed. In the preferred embodiment, the frame members are pivoted to the support bar and springs bias the frame members toward one another.

DESCRIPTION OF THE PREFERRED EMBODIMENT

Figure 1:
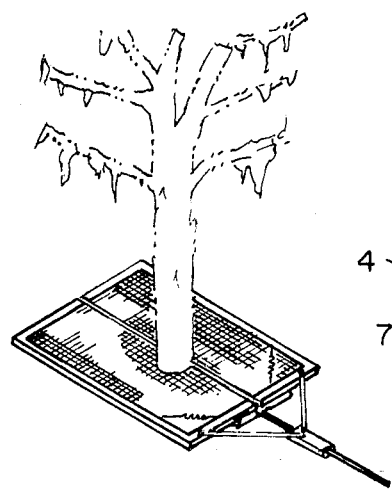
FIG. 1 is a view in perspective of one embodiment of device of this invention in use.

Referring now to the drawing for one illustrative embodiment of device of this invention, reference numeral 1 indicates the assembled device. The device 1 has a handle 2, a support bar 3 to the center of which the handle 2 is attached, and a pair of frame members, left frame 4 and right frame 5, pivotly mounted on the support bar 3.

Each of the frames 4 and 5 is made up of a bottom rail 6, a side rail 7, and a top rail 8 joined securely to define a C-shaped frame with one open side. The frames are mounted with their open sides facing one another, as shown in the drawing.

The frames are pivotally mounted to the support bar by means of pins 9 fixed to and projecting upwardly from the support bar, and extending into holes through the bottom rails near the facing ends of the bottom rails 6. The pins 9 are headed, or provided with capnuts or the like to prevent the inadvertent removal of the frames from the pivot pins.

Near the junction of the bottom rails 6 and the side rails 7, the bottom rails 6 are provided with outer or link pivot pins 10, to which one end of a link 11 is pivotally mounted. The other end of each link 11 is pivotally mounted on a sleeve 13, by means of pivot pins 14. The sleeve 13 is slidably mounted on the handle 2.

Springs 15 are mounted at one end on the side rail 7 of each frame and at the other end on the support bar 3. The springs are tension springs, and are in tension, so as to bias the frames 4 and 5 continuously toward one another around the pivot 9.

Figure 2:
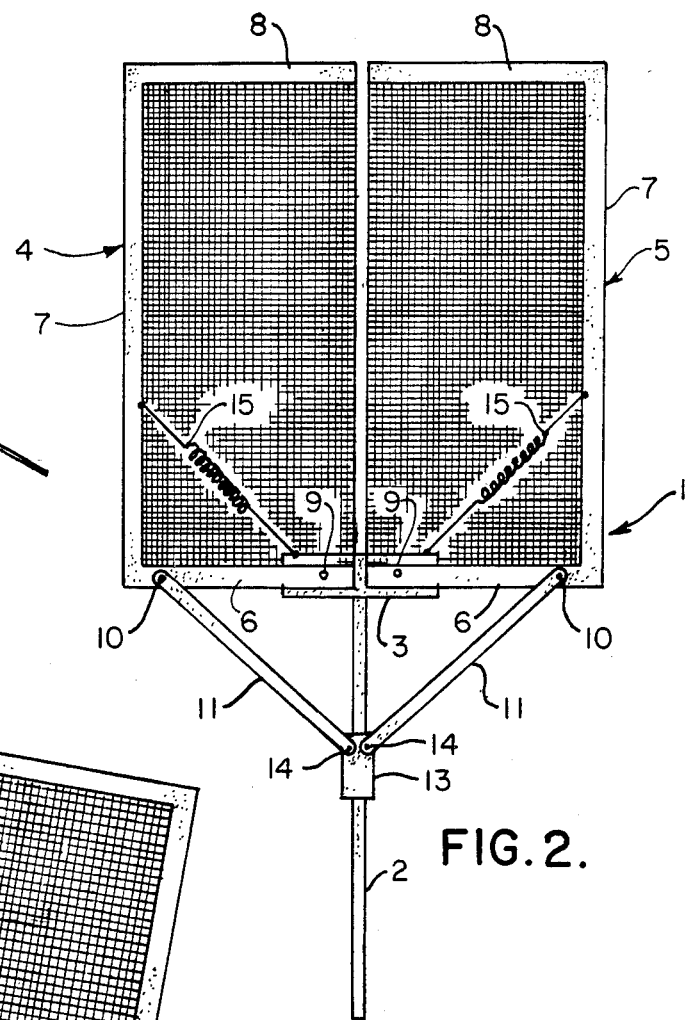
FIG. 2 is a top plan view of the device shown in FIG. 1, with frame members in their normal biased closed position.
Figure 3:
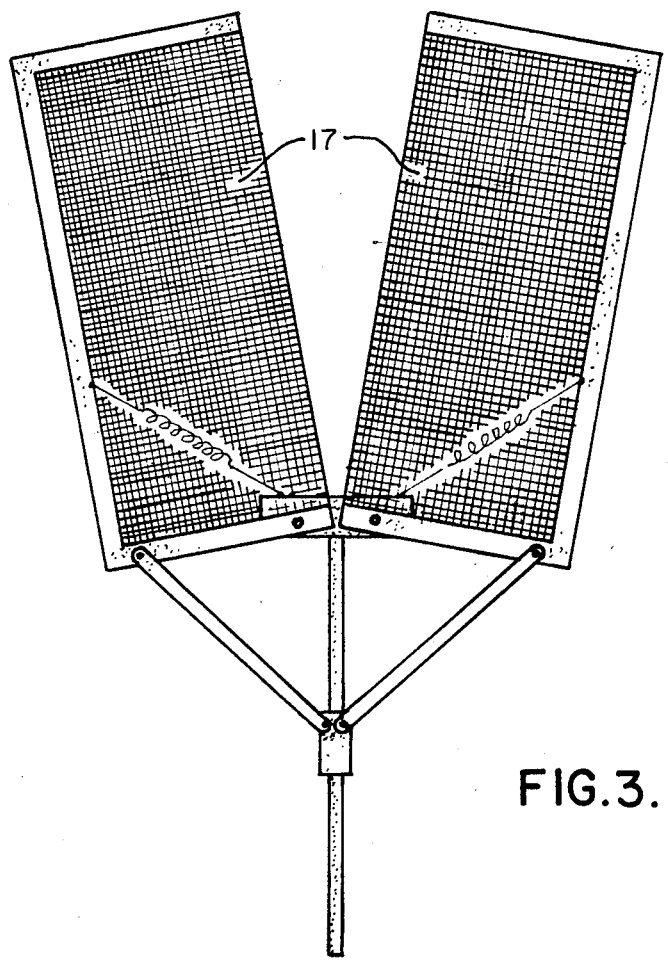
FIG. 3 is a top plan view of the device showing the frame members in spread apart position.

In the operation of the device, when it is to be placed around a stem or trunk of a plant to be trimmed, the sleeve 13 is moved manually with respect to the handle toward the outer end of the handle, as shown in FIG. 3, to cause the frames 4 and 5 to move away from one another at their outer ends. The device is then put in position with respect to the trunk, and the sleeve released, whereupon the springs 15 will cause the frames to move to the position shown in FIGS. 1 and 2, embracing the trunk or stem. The netting 17 can be of the nature of plastic screen, nylon netting or the like, which has enough give or elasticity to conform to the contour of the trunk, also as shown in FIG. 1. When the trimming is finished, the cuttings will be lying on top of the screen, and if the sleeve is then pulled back against the bias of the springs, and the device carefully removed, the cuttings will all be on top of the screen where they can be removed to a trash bag or the like.

Numerous variations in the construction of the device of this invention, within the scope of the appended claims, will occur to those skilled in the art in the light of the foregoing disclosure. Merely by way of example, the frame can be given a different shape, as by bowing the side frame 7 to streamline the shape of the frame. The pivoting arrangement can also be varied, for example, if the support bar is elongated to the point at which the pivots 9 can be put in the position of the pivots 10, the links 11 can be pivoted to pivots at the position of the present pivots 9, or the sleeve itself can be connected pivotally to the frame at the position of the pivots 9. The shape of the handle, the arrangement of the slide on the handle, the types of springs and their position, can all be changed. For example, a compression spring can be positioned around the handle within a cavity in the sleeve, one end of the spring being mounted to the handle between the outer end of the handle and an abutment within the sleeve cavity. The support bar can take the form of a channel, opening toward the frames, with the bottom rails within the channel, and a pivot pin extending between the walls of the channel. The facing ends of the top rails can be contoured to provide a V-shaped mouth to facilitate entrance of the trunk or stem. It may, for some purposes, be unnecessary to provide the sleeve and link arrangement to open the frames, particularly if a mouth is provided, the thrust toward the trunk being sufficient to wedge open the frames and admit the trunk. To make the nets easily replaceable, eyelets or the like can be provided around the frame, with laces, or strips of Velcro or the like can be placed on the frame and around the outer margins of the net. Triangular gussets of net can be attached to the outer side of the bottom rails and to the inner edge of the links 11. These variations are merely illustrative.

I claim:

1. A horticultural aid comprising a handle, a laterally extending support bar connected to said handle, a pair of frame members having open sides facing one another, pivot means for mounting said frame members on said support bar for limited relative swinging movement of said frame members toward and away from one another, spring means continuously biasing said frame members toward one another, hand manipulable frame operating means for moving said frames relative to one another against the bias of said spring means, and elastic netting mounted in said frame members, arranged to embrace a small trunk of limb of a plant to be trimmed when said operating means is manipulated against the bias of said spring means for moving said frame members away from one another to receive said trunk or limb and released to permit the said spring means to bias the frames toward one another around said trunk or limb.

2. The device of claim 1 wherein the handle is a straight member joined to the center of the support bar to form a T shaped member.

3. The device of claim 2 wherein the hand manipulable frame operating means comprises a sleeve slidably mounted on said handle, and links pivotally mounted at one end on said sleeve and at another end, on a part of said frame members spaced outwardly from said pivot member.

4. The device of claim 1 wherein the spring biasing means are tension springs each connected at one end to said support bar and at another end to one of said frame members.

5. The device of claim 1 wherein the frame members are C-shaped.

* * * * *